US010195767B2

(12) United States Patent
Acworth et al.

(10) Patent No.: US 10,195,767 B2
(45) Date of Patent: Feb. 5, 2019

(54) METHOD AND APPARATUS FOR CUTTING MOSAIC TILE

(71) Applicants: Edward Acworth, Boston, MA (US); Paul Heslinga, Stamford, CT (US); Stephen Nestinger, Santa Clara, CA (US); Alan Argondizza, Cambridge, MA (US)

(72) Inventors: Edward Acworth, Boston, MA (US); Paul Heslinga, Stamford, CT (US); Stephen Nestinger, Santa Clara, CA (US); Alan Argondizza, Cambridge, MA (US)

(73) Assignee: Artaic, LLC, Boston, MA (US)

( * ) Notice: Subject to any disclaimer, the term of this patent is extended or adjusted under 35 U.S.C. 154(b) by 517 days.

(21) Appl. No.: 14/929,558

(22) Filed: Nov. 2, 2015

(65) Prior Publication Data

US 2017/0120479 A1    May 4, 2017

(51) Int. Cl.
*G05B 19/4097* (2006.01)
*B28D 1/18* (2006.01)
*B28D 7/00* (2006.01)
*B28D 1/22* (2006.01)

(52) U.S. Cl.
CPC ............... *B28D 7/005* (2013.01); *B28D 1/22* (2013.01); *G05B 19/4097* (2013.01); *G05B 2219/35142* (2013.01); *G05B 2219/35195* (2013.01)

(58) Field of Classification Search
CPC . B28D 7/005; B28D 7/00; B28D 1/22; B28D 1/00; B28D 1/30; G05B 19/4097; G05B 2219/35142; G05B 2219/35195; Y10T 83/748; Y10T 83/0524; Y10T 83/162
See application file for complete search history.

(56) References Cited

U.S. PATENT DOCUMENTS

| | | | | |
|---|---|---|---|---|
| 5,443,680 A | * | 8/1995 | Gerber | B44B 9/00 156/362 |
| 5,568,391 A | * | 10/1996 | Mckee | B28B 11/044 700/122 |
| 6,223,736 B1 | * | 5/2001 | Yasuga | B28D 1/225 125/23.02 |
| 2007/0250197 A1 | * | 10/2007 | Glass | B44C 3/126 700/96 |
| 2011/0239572 A1 | * | 10/2011 | Calapkulu | B44C 3/123 52/390 |

* cited by examiner

*Primary Examiner* — Phong Nguyen
(74) *Attorney, Agent, or Firm* — Robert Schuler

(57) ABSTRACT

A mosaic tile design and manufacturing system is comprised of a mosaic design application, a network server and a tile cutting apparatus. A mosaic artist can use the mosaic design application to specify the placement, color and shapes of a plurality of mosaic tile comprising a mosaic design. The tile shapes can be a combination of standard and non-standard shapes, and the design tool can generate instructions that can be applied by the server to the tile cutting apparatus to control the cutting apparatus to make custom tile cuts that result in a tile with a non-standard shape.

9 Claims, 8 Drawing Sheets

FIG. 6  MOSAIC DESIGN AND CUTTING SYSTEM 400

FIG. 7

WORKSHEET FILE FORMAT 700

IMAGE SIZE (Height X Width)

GROUT LINE WIDTH (Inches)

TILE X/Y POSITION: Grid or Free Form
        (Grid: (X=Grid position12, Y=Grid Position15))
        (Free Form: Cartesian Coords.)

TILE IDENTIFY (Stock Code/SKU, reference
        manufactured stock material and color)

TILE SHAPE: STANDARD/CUSTOM

PER TILE CUSTOM CUT INFO.:

ADVANCEMENT DISTANCE(S) & CUT ANGLES

METHOD AND APPARATUS FOR CUTTING MOSAIC TILE

1. FIELD OF THE INVENTION

The present disclosure relates to automating the cutting of mosaic tiles using a computer controlled apparatus that is suitable for making multiple, angled cuts to a mosaic tile to a specified geometry.

2. BACKGROUND

Classical mosaic art is a great source of visual splendor dating back to ancient Greece and Rome. The impact of this art form remains enduring as mosaics continue to adorn large public spaces and add beautiful accents to private homes. Today, this ancient art remains a heavily labor-intensive exercise in both design and construction. It has stubbornly resisted automation, adding considerable cost to any project limiting its usage. Conditions are now suitable for introducing robotics and software tools to design, render, and manufacture mosaic artwork. In the tile mosaic industry, there are two styles of mosaic fabrication: "free-form" and "grid". A mosaic fabricated in the grid style typically has square tiles laid out in a rectilinear pattern as shown in FIG. 1B. As can be seen in FIG. 1A, it is very difficult to accurately render an image, such as the image in FIG. 1A, in this mosaic style. On the other hand, free form style mosaics can be fabricated with irregularly shaped tiles, and as shown in FIG. 1C, this style of mosaic can more accurately render the image in FIG. 1A. While free-form is considered to be the ultimate artisanal type, manually cutting each tile to a specific shape is rather tedious and difficult to automate making free-form mosaics very costly due to increased production costs.

Typically, a mosaic design is based upon a pre-existing image, or an image that is created by an artist specifically for the mosaic design. Regardless, mosaic design applications are available that automate portions or substantially all of the mosaic design creation process, particularly for the simpler case of "grid" mosaic. A mosaic designer can use the mosaic design application to assist with laying out individual mosaic tiles in a grid or free-form style that is a reasonable facsimile of the original image. The design tool can automate certain steps of the mosaic creation process and can support manual intervention by the designer in the mosaic creation process. One such design tool is available from Artaic, LLC under the trade name TerreraPro.

A mosaic design application can be used to assist with the process of placing individual tiles in a mosaic design, and the tool can operate to generate a mosaic worksheet file. The mosaic design application can be a computer application running on a computer workstation or other suitable computational device, and the worksheet file can have, among other things, information relating to the size of a mosaic image, grout line width, and the position, the color, and the size and shape of each tile in a mosaic image. The mosaic design application can compile the information comprising the worksheet file into machine instructions which can be stored in association with a network server. Some portion of the tiles that are included in the mosaic design rendered by the mosaic design application can be a standard size and shape, and some portion of the tiles included in the mosaic image can be a non-standard size and shape. In this regard, using a mosaic design application to lay out tiles in a free-form style very typically can result in some number of the total tiles in the mosaic having a variety of non-standard or irregular shapes. Irregular in this context means that the tile is other than a standard tile shape. For example, if a standard shape is considered to be square, than a non-standard shape can be a polygon other than a square. So after an irregularly shaped tile is cut, it can take on a polygonal shape that may or may not be a square shape, such as a triangle, pentagon, etc.

3. BRIEF DESCRIPTION OF THE DRAWINGS

The present invention can be best understood by reading the specification with reference to the following figures, in which:

FIG. 7 is a diagram illustrating a worksheet file format 700.

4. DETAILED DESCRIPTION

Figure 1:
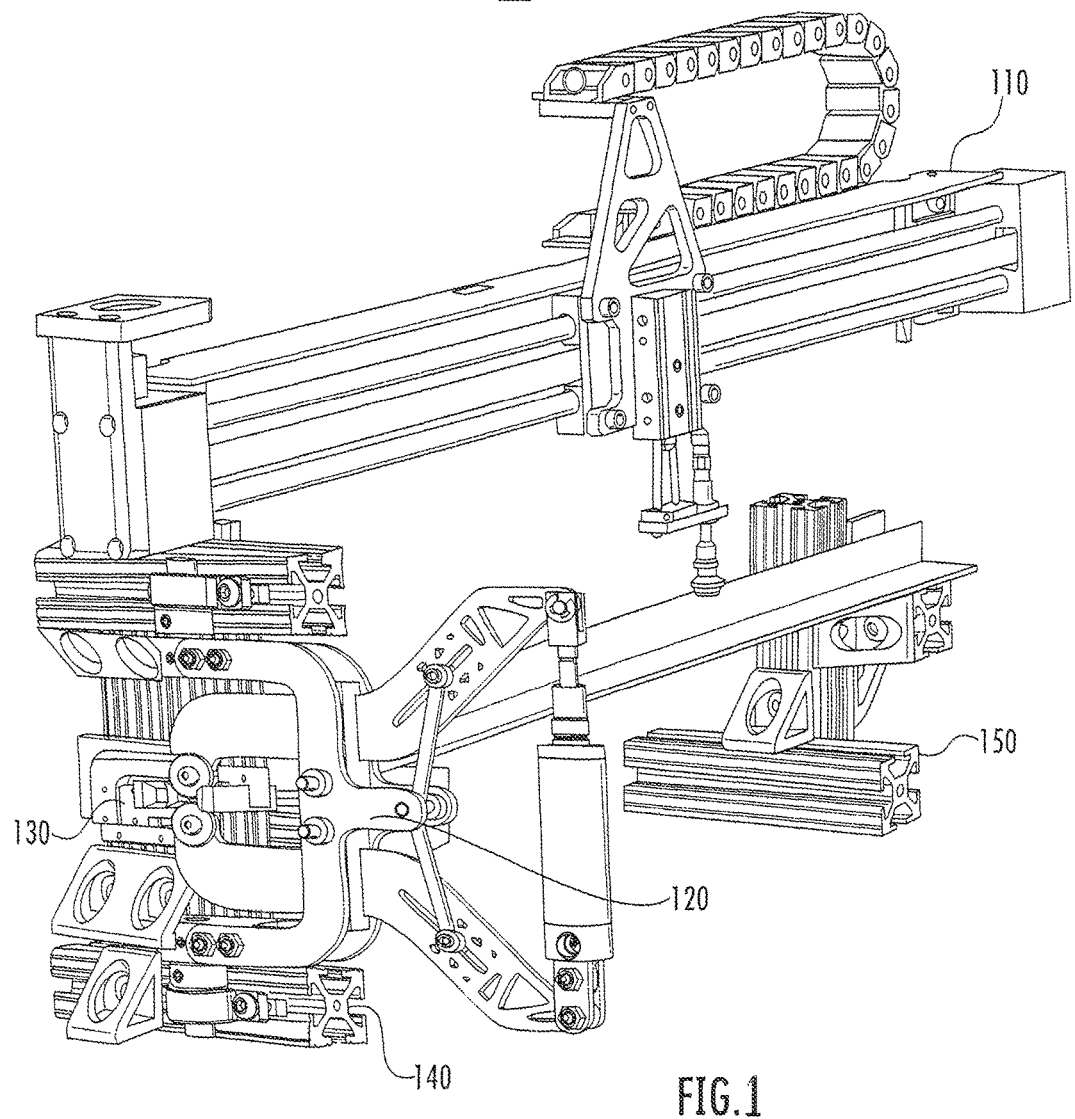
FIG. 1 is a diagram showing a tile cutting apparatus 100.

In order to manufacture a free-form style mosaic design, created by a mosaic design application in which some portion of the tiles are a non-standard geometric shape (custom tile shape), it is typically necessary to make one or more cuts to a standard shaped tile or tile feed stock to obtain a tile with the non-standard geometric shape (custom shape). Unless a mosaic design is very small (i.e., the design does not have many tiles), a typical free-form style mosaic design can have a large number of tiles that need to be cut in order to obtain the number of non-standard shaped tiles necessary to manufacture the design, and as it is typically necessary to cut each non-standard shaped tile by hand, it can be prohibitively expensive to manufacture the typical free-form style mosaic design. In order to hand cut each tile, it is necessary for a skilled person to have the necessary tile cutting information (cut angles and side lengths, etc.) and then this person has to carefully lay out each cut on a tile prior to actually making the cut. The skill necessary to consistently make prescribed cuts resulting in a non-standard shaped tile can be acquired with experience over time, but this skill is not quickly acquired and not everyone is able to achieve the skill level necessary to make the custom tile cuts. Consequently, it would be advantageous to automate the process of cutting standard shaped tiles to be non-standard shaped tiles for inclusion in a free-form style mosaic design, and it would be advantageous if the automated tile cutting process is performed quickly and with the most efficient use of the tile stock/material.

In order to automate the custom tile cutting process, we designed a tile cutting apparatus that is controlled to quickly and efficiently make one or more angled cuts to a continuous length of tile stock or to a standard square tile to form a tile having a non-standard geometric shape (custom shape). The custom shaped tile can have one or more perimeter dimensions that are different than the perimeter dimensions of a standard mosaic tile, or a custom tile can have one or more corner angles that are different that corner angles of a standard shaped tile. As described earlier in the background section, a mosaic worksheet file can be created as the result of employing a mosaic design application to lay out tiles. This file can have, among other things, information relating to the size of a mosaic image, grout line width, and the position, the color, and the size and shape of each tile in a mosaic image, and the information comprising the worksheet file can be compiled into logical machine instructions (i.e., a machine control file cutting program) and stored in association with a network server. These logical machine instructions can be organized into a separate tile stock cutting program for each mosaic design generated by the mosaic design application. The instructions comprising the tile cutting program can be employed to control the operation of the tile cutting apparatus to make the custom tile stock cuts as described above. Specifically, a server with access to the tile cutting program can be linked to the tile cutting assembly and operate on the instructions in the tile cutting program to control the tile cutting apparatus to make the custom tile stock cuts described earlier.

The robotic tile cutting apparatus can have a tile stock cutting head assembly, a tile stock stabilizing head assembly, and a stock runner and advancement assembly. The tile cutting apparatus can make consistently accurate cuts to the tile stock to form custom tiles with a wide range of geometric shapes (cut angles, tile dimensions), and the tile cutting apparatus can make consistently accurate cuts to different tile materials (glass tile, ceramic tile, other material). As described earlier, the robotic tile cutting apparatus is controlled to make cuts to the tile stock by advancing a tile stock a prescribed distance along the stock runner, to laterally stabilize the tile stock prior to it being cut, to rotate the tile cutting head to a prescribed cutting angle, and to control the cutting head to cut the tile stock at the prescribed angle. The actions of advancing the tile stock and rotating the tile cutting head are effected at substantially the same time, and subsequently the actions of laterally stabilizing and cutting the tile stock are effected at substantially the same time. The coordination of each of these actions is carefully parallelized, and timed to minimize the time it takes to cut each individual custom tile, and the cut angles are strategically sequenced to minimize waste of the tile stock. The operation of the robotic tile cutting apparatus under the control of the tile cutting program is described below with reference to the corresponding figures. The material to be cut is referred to herein as tile stock. The tile stock can be of any dimension that is able to be fed by the tile cutting apparatus to the cutting heads.

It should be understood that the figures referenced in this description are for illustrative purposes only, and that any dimensions or tolerances that are illustrated as being associated with the assemblies are not limiting in any way. Further, the sub-assemblies comprising the tile cutting apparatus illustrated in the figures are not intended to limit the scope of the embodiments. Other sub-assemblies can be employed in combination to achieve similar operational characteristics and results as those described herein.

FIG. 1 generally illustrates a tile cutting robot assembly 100 comprising a stock advancement sub-assembly 110, tile stock cutting head sub-assembly 120, and a tile stock lateral stabilizer head sub-assembly 130, with each of the three sub-assemblies being secured to a front and a rear base assembly 140 and 150 respectively. The two base assemblies serve to secure the positions of the three sub-assemblies with respect to each other and to provide the assembly 100 with a stable base on which it can operate. However, the base assembly can be replaced by any appropriate structure that secures the positions of each sub-assembly with respect to the other sub-assemblies. The tile stock cutting head and the tile stock lateral stabilizer sub-assemblies, labeled 120 and 130 respectively, are described below with reference to FIG. 2.

Figure 2:
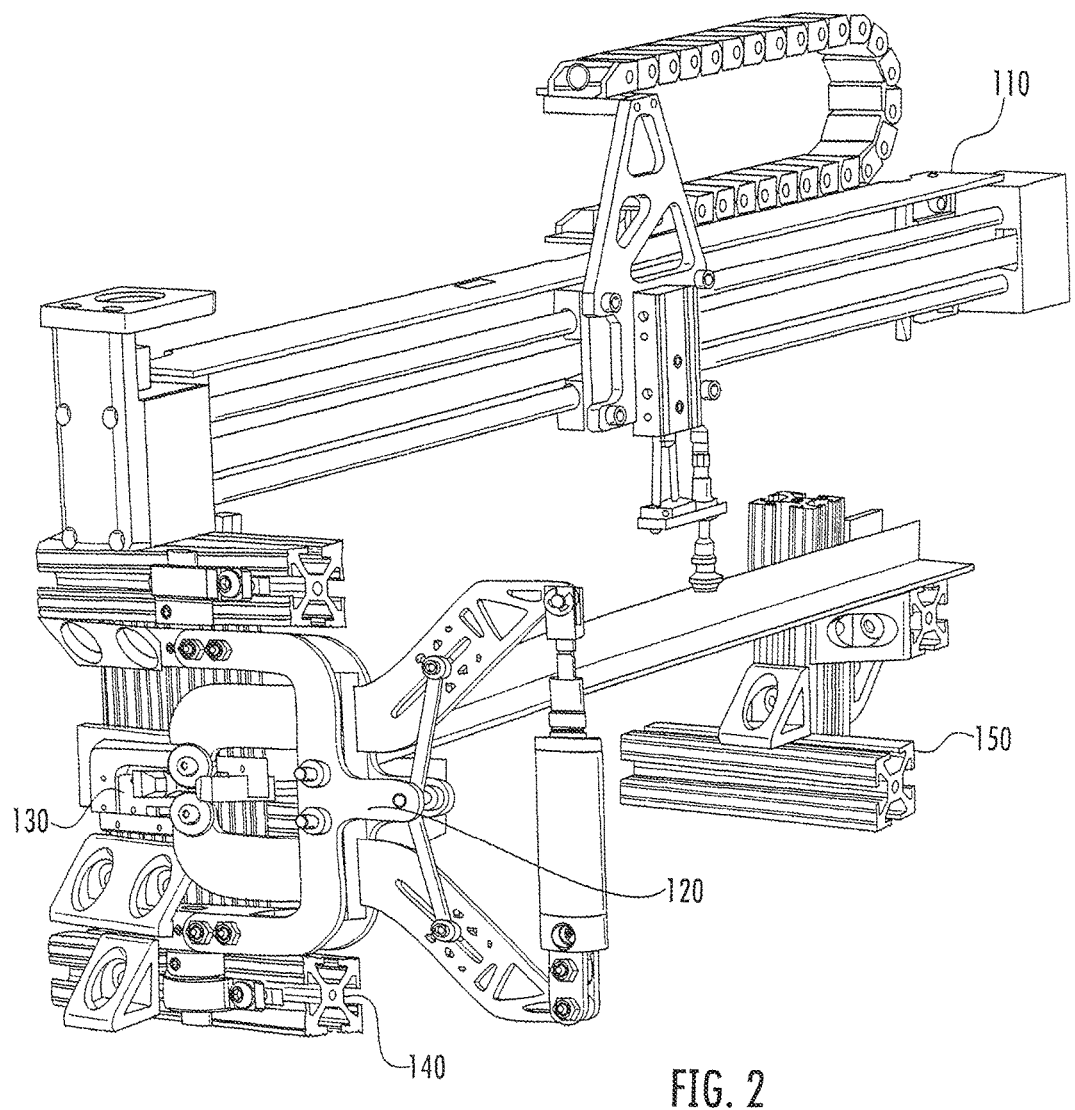
FIG. 2 is a diagram showing cutting head and stock stabilizer sub-assemblies comprising the tile cutting apparatus 100.

The tile stock cutting head sub-assembly 120, described earlier with reference to FIG. 1, is shown in FIG. 2 are being comprised of several component parts; namely, a pneumatic or other suitable type of actuator 121, upper and lower cutting arms 122A and 122B respectively, upper and lower cutting elements 123A and 123B respectively, and a cutting head carrier assembly 124. While the cutting head sub-assembly 120 embodiment described here has multiple cutting arms and corresponding cutting heads, other tile cutting head arrangement and mechanisms can be employed to achieve the same results without using the same mechanism. For example, a water jet tile cutting sub-assembly can be mounted to the assembly 100 and can be rotated to make angled cuts in a similar manner as the sub-assembly 120 described here. A laser tile cutting sub-assembly can be mounted to the tile cutting assembly 100, or any other type of suitable tile cutting mechanism can be mounted to the assembly 100. The sub-assembly 120 is described in more detail later with reference to FIG. 3. The tile stock stabilizer sub-assembly 130, shown in FIG. 2, is comprised of several component parts; namely, a pneumatic actuator component 131, a first and second stock gripper arms 132A and 132B respectively, and associated first and second gripper elements 133A and 133B respectively. The operation of the stabilizer sub-assembly serves to immobilize the tile stock (i.e., to maintain the position of the tile stock with respect to the cutting heads), and to dampen any excitation (dampen shock vibration/resonant frequency) in the tile stock during the cutting process. If not stabilized during the cutting process, the tile stock material will be free to excite at an undamped characteristic frequency, leading to poor quality cuts, such as non-straight line cuts, wavering line cuts or a ctu that does not cleave directly through the tile material in a plane that is orthogonal to the surface of the tile stock material. The sub-assembly 130 is described in more detail later with reference to FIG. 4.

In operation, a pneumatic actuator 131 is controlled to move the first and second gripper arms comprising the stabilizer sub-assembly 130 in FIG. 2 in opposite directions (the first arm 132A moves laterally to the left and the second arm 132B moves laterally to the right in FIG. 2) until coming into contact with opposing sides or lateral edges of a tile stock (not shown), resting on a runner 112 (illustrated later with reference to FIG. 4), at substantially the same time so as not to displace the lateral position of the tile stock on the runner. The cutting head carrier 124 is being rotated clockwise or counter clockwise (when viewed from either the top of bottom of the assembly) into a position, that permits the cutting heads to cut the tile stock at a prescribed angle, and this rotation occurs at substantially the same time as the gripper arms are being controlled to come into contact with the tile stock. Controlling the carrier 124 to rotate at substantially the same time as the first and second arms comprising the stabilizer sub-assembly 130 are controlled to come into contact with the edges of the tile stock minimizes the time it takes to make each tile cut. At substantially the same time can mean that the carrier 124 begins to move shortly before, shortly after (fractions of a second) or at the same time that the first and second arms begin to move, and that the carrier 124 and the arms 132A and 132B stop moving at the same time or that one stops moving fractions of a second before or after the other. The intent of the substantially coincident movement between the carrier and the stabilizer arms is to stabilize the tile stock and to have the cutting heads in position to make a cut in the shortest amount of time possible. The component parts of the cutting head sub-assembly 120 will now be described in more detail with reference to FIG. 3.

Figure 3:
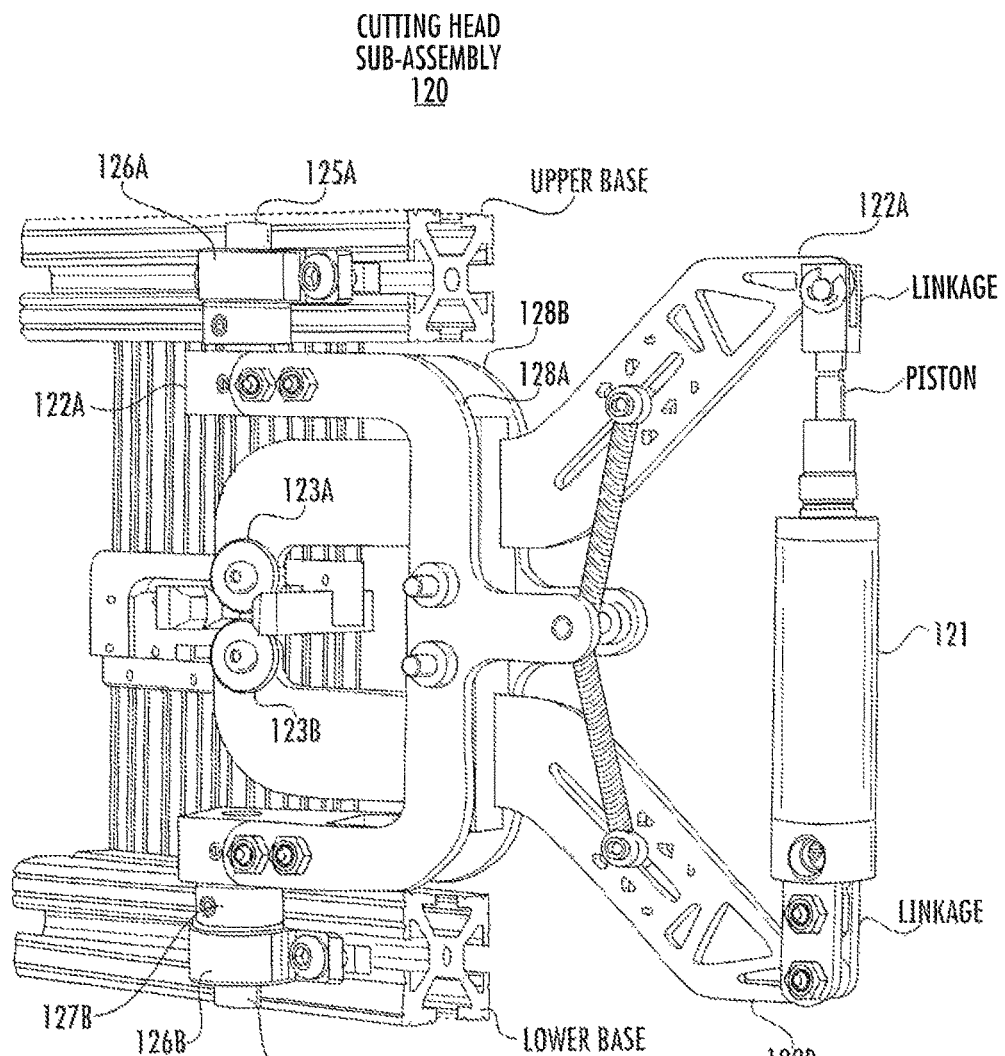
FIG. 3 is a diagram showing the cutting head sub-assembly of FIG. 2.

FIG. 3 shows the sub-assembly 120 being rotatably connected to an upper and a lower horizontal base member. Specifically, upper and lower rotatable shafts 125A and 125B respectively are rotatably secured to the upper and lower front base members by upper and lower pillow block bearings 126A and 126B respectively. The upper and lower rotatable shafts are connected by an upper and lower block element 127A and 127B respectively, which in turn are connect to both of a first and second carrier element 128A and 128B respectively. The upper and lower cutting arms are mounted between the two carrier elements and affixed to the carrier elements with upper and lower arm pivot elements, which can be nut and bolt combination, or can be any combination of elements that both secures each arm to the carrier and allows the proximal and distal ends of each arm to be moved in a vertical direction while remaining fixed at the pivot points with respect to a vertical direction. The cutting element 123A is attached to the proximal end of the upper cutting arm 122A and the cutting element 123B is attached to the proximal end of the lower cutting arm 122B such that a vertical axis (not shown) passes through the center point of the radius of both cutting elements. Each cutting element can be attached with any appropriate attaching element or elements (such as a rivet, nut and bolt combination, pin and retaining washer, etc.). The distal end of the upper and lower cutting arms are attached to opposite ends of the pneumatic actuator 121 in a manner that allows them to pivot with respect to each end of the actuator. Specifically, the distal end of the upper cutting arm is connected to a pneumatic piston comprising the actuator 121 via an upper arm to piston linkage element, and the distal end of the lower cutting arm is connected to the bottom portion of the actuator 121 via a lower arm to actuator linkage element. While the stock cutting head sub-assembly 120 is described as having two opposing cutting elements, other tile stock cutting mechanism can be employed. For example, a mechanism that directs air. or some other liquid or gas, under pressure to effect tile cutting can be employed. Or a grinding type mechanism can be employed to effect the tile cutting operation. Also, a tile cutting mechanism can perform a cutting operation from one side, as opposed to the two sided tile cutting operation described here. Laser cutters can be used, or any suitable cutting device that can be incorporated into the tile cutting apparatus 100 can be employed that is able to cut a ceramic or a glass tile.

In operation, the actuator 121 is controlled to move the distal ends of the upper and lower cutting arms apart, which has the effect of moving the proximal ends and the cutting elements closer together permitting tile stock positioned between the cutting elements to be cut at an angle that is prescribed by information comprising a worksheet file generated by the mosaic design application. This cutting head 120 arrangement permits the upper and lower cutting elements to be rotated in a horizontal plane around a single vertical axis which results in there being no deviation from the center, horizontal axis of the tile stock at any operational cutting angle. The arrangement results in tile accurate stock cuts of consistently high quality (straight cuts with limited or no disintegration or shattering of the tile around the area of the cut).

Figure 4:
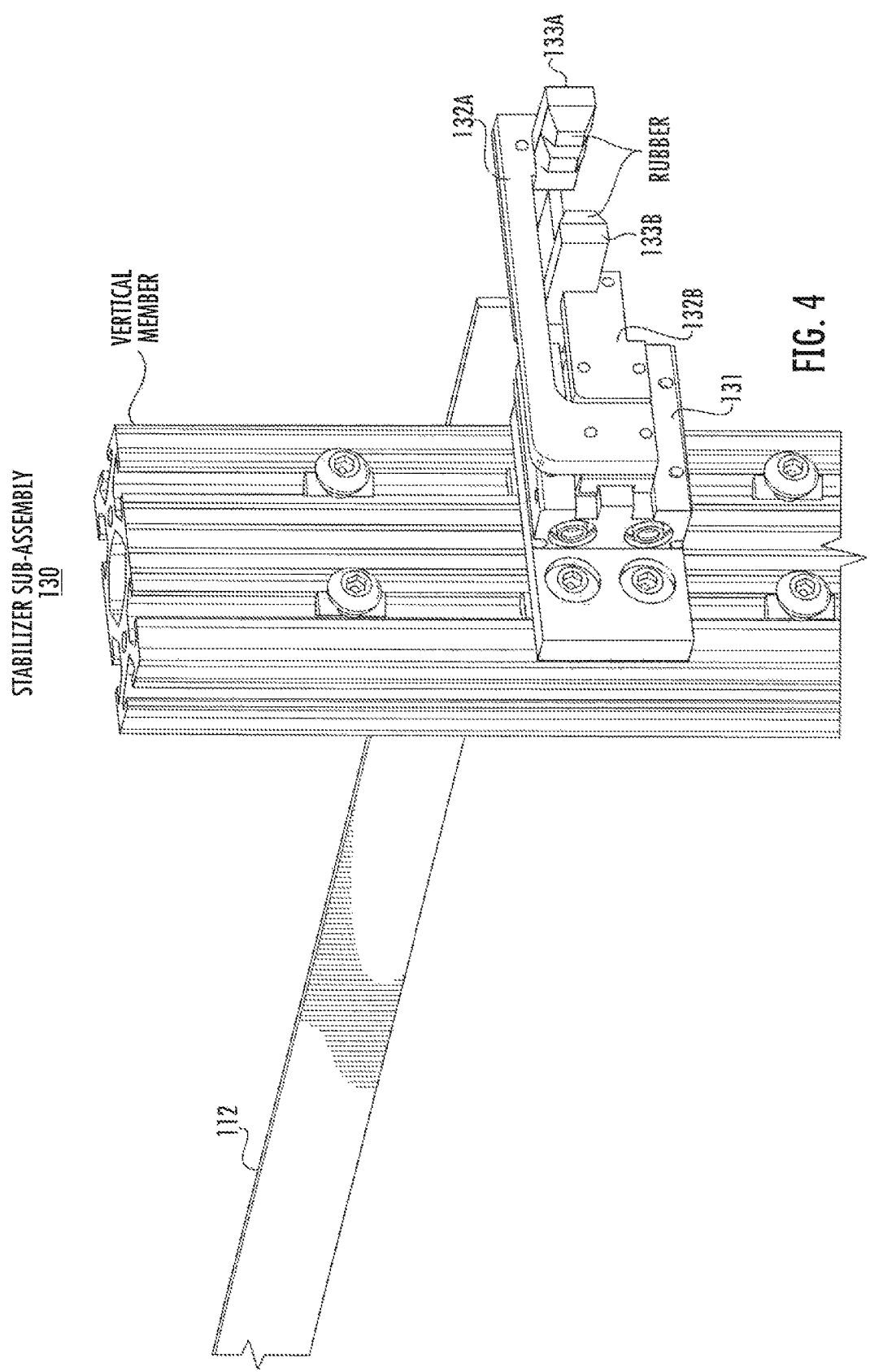
FIG. 4 is a diagram showing the stabilizer sub-assembly of FIG. 2.

The tile stock stabilizer sub-assembly 130, described earlier with reference to FIG. 2, is illustrated in FIG. 4 without the cutting head sub-assembly 120. As described earlier, the stock stabilizer 130 serves to securely maintain the position of the tile stock with respect to the position of the cutting elements during the stock cutting process. During the tile cutting process, the cutting mechanism typically imparts vibration at a resonant frequency that is characteristic to the material being cut. In order to affect a straight, clean, accurate cut (together referred to here as a quality tile cut) in tile stock composed of different materials, different dimensions and different cutting angles, it is necessary to determine the securing force applied by the stabilizer during the cutting process for each material, dimension and cutting angle. The securing pressure applied by the stabilizer for each different type of tile stock, tile stock dimension and each tile cut angle is determined empirically and incorporated into the mosaic worksheet file described earlier. Securing the position of the stock in this manner alters the characteristic resonant frequency of the tile stock material and it dampens or lowers the amplitude of the dampened frequency imparted to the material by the cutting mechanism, all of which contributes to the assembly 100 being able to make very accurate tile cuts of consistently high quality. The stabilizer sub-assembly 130 is shown to be attached to a vertical member comprising the front portion of the base 140. FIG. 4 also shows a component part (tile stock runner) of the tile stock advancement sub-assembly 110 on which the tile stock rests while being moved towards and through the cutting elements. The component part is labeled runner 112 in FIG. 4 and it is shown to be attached to the vertical member comprising the front portion of the base 140. Each gripper element, 133A and 133B, described earlier with reference to FIG. 2 is comprised of a soft, tactile rubber material that comes into contact with the lateral sides of the tile stock when the gripper arms are controlled to secure the tile stock. This rubber material serves to positively secure the tile stock without damaging it.

Figure 5:
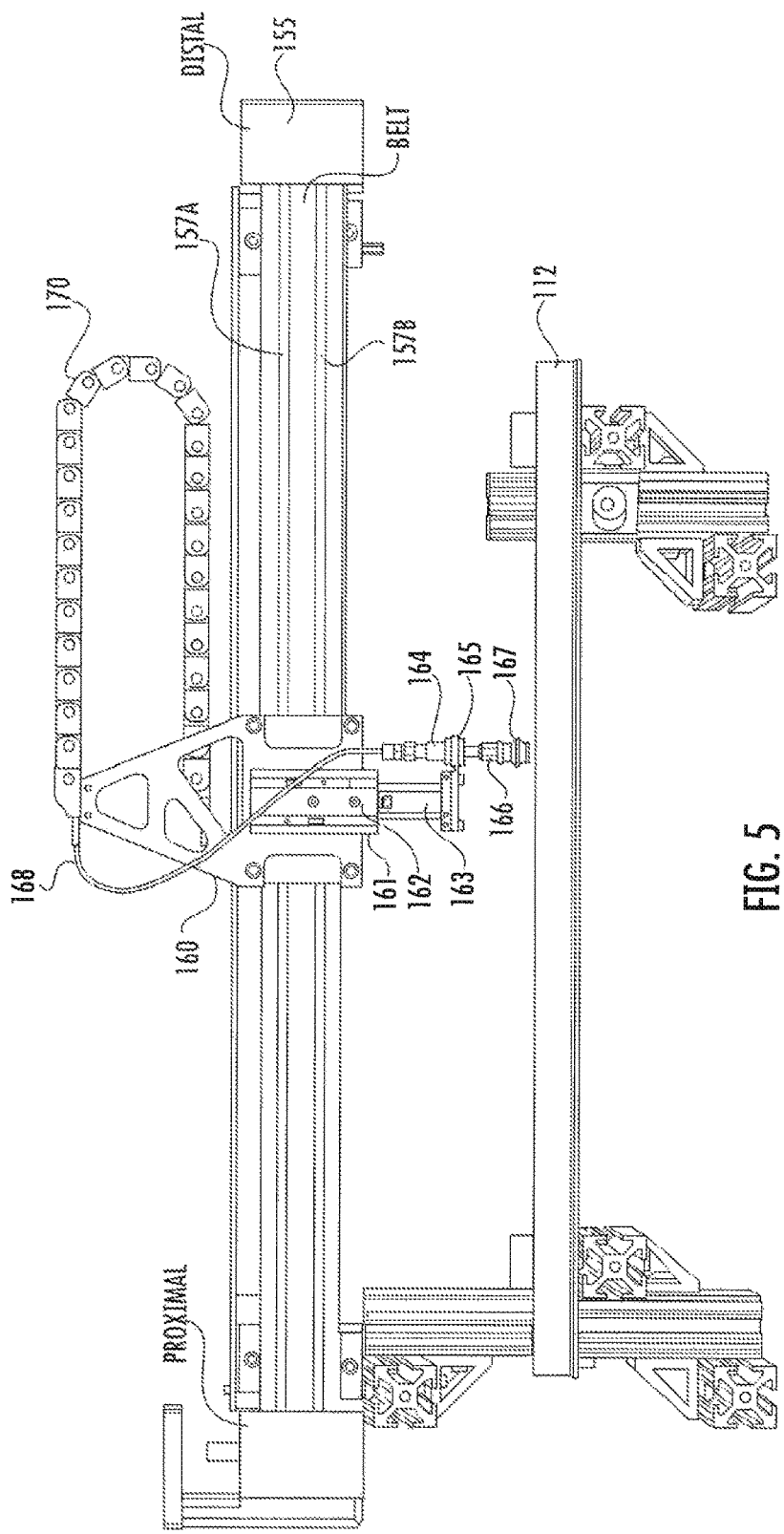
FIG. 5 is a diagram showing a stock advancement mechanism comprising the tile cutting apparatus 100.

FIG. 5 is a drawing of one possible embodiment of the tile stock advancement mechanism 150 positioned over the runner 112. The advancement mechanism 150 is comprised of a belt drive assembly 155, a stock retention carrier assembly 160 and a cable carrier assembly 170. The belt drive assembly 155 has a belt 156 that is driven by a motor (not shown) located at either the proximal or distal end of the assembly 155, and the assembly 155 has two guide rods 157A and 157B. Each guide rod passes through two guide rod openings comprising the carrier assembly 160, and the carrier assembly is moved laterally along the guide rods by the belt 156. A stock retention assembly 161 is attached to the stock retention carrier assembly 160, and it is comprised of a pneumatic actuator 162 that operates to raise and lower a tile stock retaining sub-assembly 163. The sub-assembly 163 (circumscribed by a dotted line) is comprised of a pneumatic tube coupling element 164 attached at its distal end to the top surface of a plate 165, and a suction cup coupling element 166 is attached at its distal end to the lower surface of the plate 165. A flexible pneumatic tube 168 is attached to a proximal end of the element 164 and a pneumatic cavity runs from the proximal end of element 164 to the proximal end of suction cup retaining element 166 to a suction cup element 167 that is attached to the proximal end of the retaining element 166. The flexible pneumatic tube enters a proximal end of the cable carrier 170, and emerges from a distal end of the cable carrier and continues to an air source not shown.

Continuing to refer to FIG. 5, the advancement mechanism is controlled by instructions generated by the mosaic design application, and which are stored on a computational device associated with the tile cutting assembly 100, to lower the suction cup 167 until it makes contact with a top surface of a tile stock that rests on the runner 112. Once the cup 167 makes contact with the top surface of the tile stock, the pneumatic system can be controlled to apply a vacuum or negative pressure to the surface of the stock which has the effect of securing the stock retention assembly 161 to the tile stock. Once the retention assembly 161 is securely attached to the tile stock, it can be controlled to move the tile stock along the runner 112 a selected lateral distance towards the proximal end of the mechanism 150 in the direction of the cutting heads.

Figure 6:
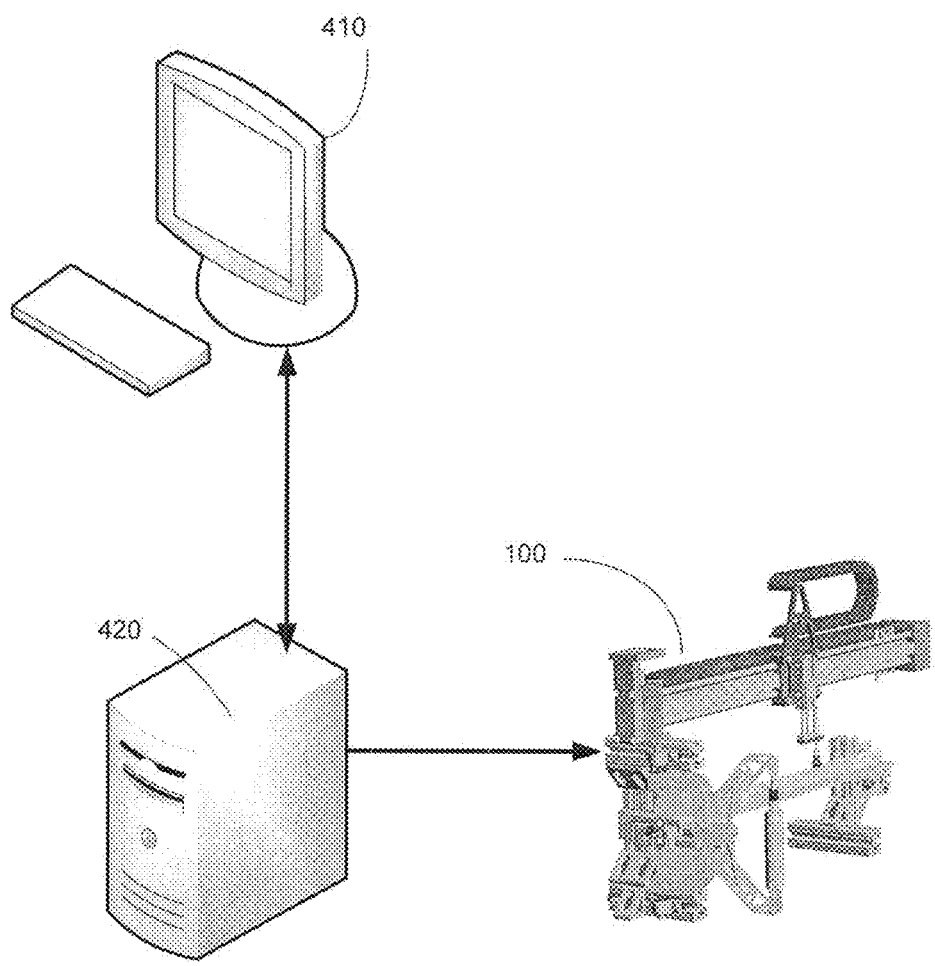
FIG. 6 is a diagram showing a mosaic design and tile cutting system 600.

As described earlier, a mosaic worksheet file can be generated using a mosaic design application, which can be a computer application running on a work station or any type of suitable local or networked computational device, and a mosaic artist can use the design application to lay out and edit tile positions in a mosaic design. This worksheet file can have, among other things, information relating to the size of a mosaic image, grout line width, and the position, the color, the size and shape of each tile in a mosaic image, whether the tile is a standard or custom shape and information used to generate instructions to effect custom cuts such as stock advancement distances and cut angles. The information comprising the worksheet file can be compiled into logical machine instructions by the mosaic design application, and these instructions can be stored in association with a network server as a mosaic tile cutting program. The instructions comprising the tile cutting program can be used by a network server linked to the tile cutting assembly 100 to control the operation of the tile cutting apparatus 100 to make the custom tile stock cuts as described above. The relationships between a mosaic design application or tool 411 residing on a workstation 410, a network server 420 and the tile cutting assembly 100 is shown with reference to FIG. 6.

A mosaic design application 411, such as the one described earlier, can reside on a local workstation 410, on a local server 420 or it can reside on a networked server (not shown) to which the workstation can connect to in order to gain access to and run the mosaic design application. A mosaic artist can interact with the design tool at the workstation 410 in FIG. 6 to create an instance of a mosaic design. Each instance of a mosaic design can correspond to an instance of a worksheet file that can be stored in the server 420 that is shown to be linked to the workstation 410 in FIG. 6. The server 420 is linked to the tile cutting assembly 100 and operates on instructions in a tile cutting program to control the operation of the assembly 100 to make custom cuts to a tile stock. The format of a worksheet file is illustrated below with reference to FIG. 7.

FIG. 7 illustrates a format 700 in which mosaic design information can be organized into a worksheet file prior to being compiled into a tile cutting program. The image size refers to a two dimensional (Height and Width) size of the mosaic design. The dimensions can be in inches, feet, or any other suitable unit of measure. The grout line width can be specified in any suitable unit of measure, such as in fractions of an inch, millimeters, etc. The tile position can be specified according to an X/Y grid position if the tiles are laid out a regular grid design, or if some or all of the tiles are laid out in a free-form type design, then the tile positions can be specified by any appropriate two dimensional coordinate system. Each tile is identified by a stock code or SKU or by a manufactures material number and color. The tile color(s) can be specified to be any of a plurality of available tile colors (clear, blue, red, green, etc.), and the tile shape information can specify either a standard or a custom shape. In the event that the file specifies a custom tile shape, then information specific to each instance of a tile to be cut to custom tile shape is included in the worksheet file. This information can be comprised of a specified tile stock advancement distance and a specified angle for each cut to be made to the tile stock to form a single custom tile. As indicated earlier, some or all of the information comprising the worksheet file can be compiled into an instance of a tile cutting program, and each instance of a tile cutting program represents all of the information needed to manufacture a single mosaic design. More specifically, the information comprising the shape of each instance of a custom tile is compiled into a series of instructions that represent a tile cutting program that is operated on by the server 420 to control the tile cutting assembly 100 to make each cut to a tile stock to form one or more custom tiles. The operation of the tile cutting program is described below with reference to FIG. 8.

Figure 8:
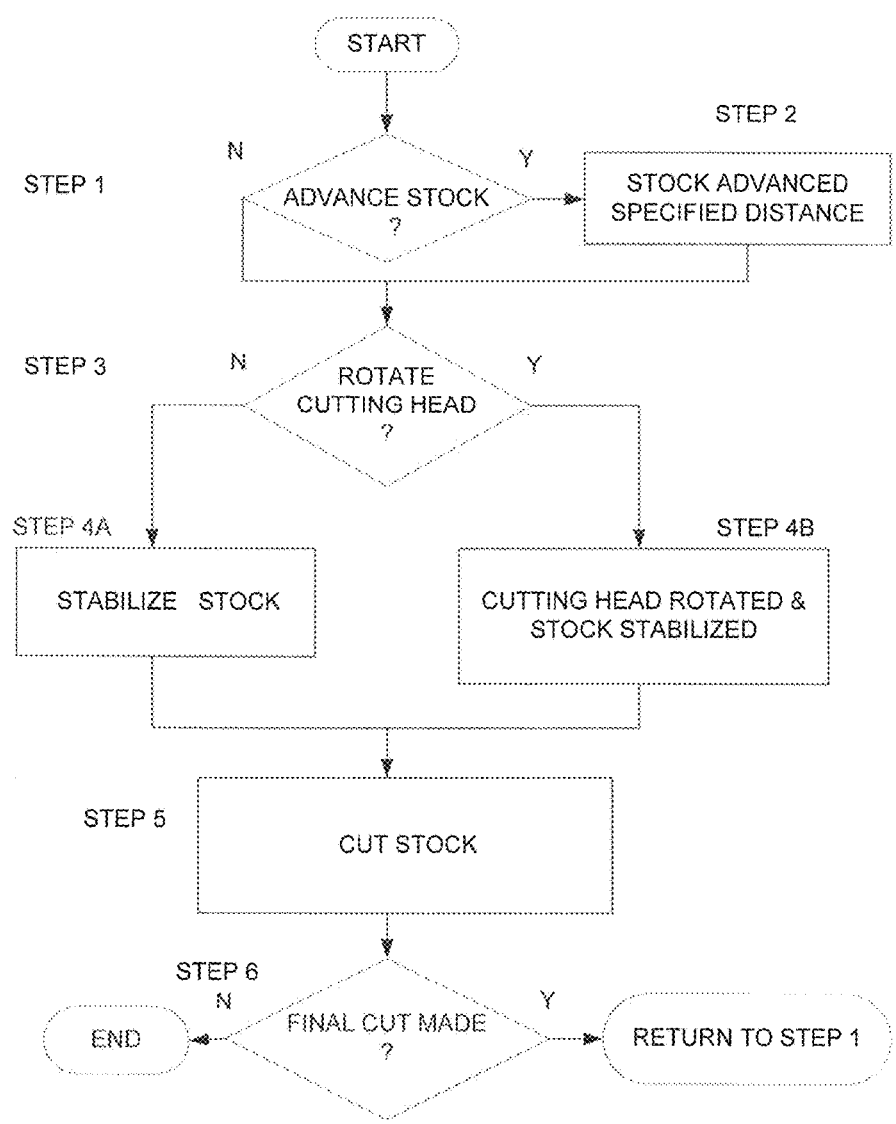
FIG. 8 is a logical flow diagram of a tile cutting program 800.

FIG. 8 is a logical flow diagram of a tile cutting program 800. This diagram illustrates a series of movements the tile cutting assembly 100 is controlled to make as the result of the server 420 operating on instructions comprising the program 800. While the flow diagram illustrates different cutting assembly 100 movements being performed in a serial manner, in one embodiment any two or more of these movements can be controlled to start at the same or substantially the same time. Coordinating the movements of different cutting assembly elements (i.e., stabilizer, cutting head, and stock advancement) has the effect of minimizing the time it takes to complete each custom cut to the tile stock. Subsequent to initializing the program, in Step I a determination is made whether or not the tile stock should be advanced, and if so, then the program flow proceeds to Step 2 and the advancement mechanism 150 is controlled to advance a tile stock resting upon the runner 112 a specified distance in the direction of the cutting heads 123A and 123B. More specifically with respect to Step 1, the retaining sub-assembly 163 is controlled to be lowered so that the suction cup 167 comes into contact with the top surface of the tile stock. After coming into contact with the tile stock, the pneumatic system is control to apply a negative pressure (vacuum) to the retaining sub-assembly 163. When the retaining sub-assembly is attached to the tile stock, it is controlled, in Step 2 to move in a lateral direction a specified distance toward the cutting heads. The negative pressure can be applied and the suction cup can remain in contact with the tile stock for as long as necessary to affect the advancement of the stock towards the cutting heads. However, if in Step 1 it is determined that the tile stock should not be advanced, then the program flow proceeds to Step 3 and it is determined if the cutting head carrier 124 should be rotated. If it should be rotated, then the program proceeds to Step 4B and the carrier 124 is controlled to rotate in a clockwise or counter clockwise direction (as viewed from either the top or bottom of the assembly 100) a specified number of degrees and at the same time the lateral stabilizing assembly 130 is controlled to grip the opposing edges of the tile stock with a predetermined stabilizing pressure in order to hold the stock firmly in position prior to it being cut. If in Step 3 the cutting head does not need to be rotated, then the process proceeds to Step 4A and assembly is controlled to grip the opposing edges of the tile stock with a predetermined stabilizing pressure. Subsequent to the tile stock being stabilized, the program flow proceeds to Step 5 and the cutting elements are controlled to move towards the top and bottom sides of the stock and the stock is cut. In Step 6, a determination is made as to whether another cut should be made, and if another cut is scheduled to be made, then the program flow returns to Step 1, otherwise the program flow ends.

Although, as described previously, the various Steps comprising the program flow in FIG. 8 are described to occur in a serial manner, the assembly 100 can be controlled to make each cut in less time if one or more of these Steps can be controlled to occur at substantially the same time. So for instance, the Step of advancing the tile stock (Step 2) can start at substantially the same time as Step 4B (cutting head carrier rotation). And the Step of stabilizing the tile stock (Step 4A & 4B) can be started at substantially the same time as Step 5, which is the step of controlling the cutting heads to move toward the tile stock surface. The time saved during the process of cutting custom tiles for a relatively large mosaic design can be significant. This significant time savings can translate directly to lowering the cost to manufacture a custom or free form mosaic design.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A mosaic tile cutting system, comprising:
   a mosaic design application operating to generate information relating to a geometric shape and dimensions for each one of a plurality of non-standard mosaic tiles within a free-form mosaic tile design;
   the mosaic design application operating on the geometric shape and dimension information, corresponding to each one of the plurality of the non-standard tiles, to calculate one or more tile stock advancement distances and one or more associated tile stock cutting angles, and compiling the calculated tile stock advancement distances and associated cutting angles into a series of computer instructions; and
   a computational device, linked to a mosaic tile cutting apparatus, operating on the series of computer instructions comprising the tile cutting program to control the mosaic tile cutting apparatus to advance the tile stock the calculated distance and to make one or more cuts to the tile stock at the calculated cutting angle to form each one of the one or more non-standard tiles;
   wherein the mosaic tile cutting apparatus comprises a mosaic tile stock advancement mechanism, a tile stock stabilizer and a rotatable tile stock cutting head and the tile stock stabilizer is controlled to grip two opposing lateral edges of the mosaic tile stock and the tile cutting head is controlled to rotate and cut the mosaic tile stock during substantially the same period of time.

2. The mosaic tile cutting system of claim 1, wherein the tile stock stabilizer is comprised of a first and a second tile stock gripper arms that are controlled to move in opposite directions to come into contact with the opposing lateral edges of the mosaic tile stock to securely maintain the position of the mosaic tile stock with respect to the cutting head.

3. The mosaic tile cutting system of claim 2, wherein the first and second tile stock gripper arms are controlled to come into contact with the opposing lateral edges of the mosaic tile stock with a predetermined securing pressure that is arrived at empirically and incorporated into the tile cutting program.

4. The mosaic tile cutting system of claim 3, wherein each of the first and second gripper arms comprise a gripper element.

5. The mosaic tile cutting system of claim 4, wherein each gripper element comprising the first and second gripper arms is composed of a soft, tactile rubber material.

6. The mosaic tile cutting system of claim 5, wherein the rotatable cutting head is comprised of an upper and a lower cutting element both of which are rotatable around an axis that is oriented at ninety degrees with respect to a plane comprising a top surface of the mosaic tile stock.

7. The mosaic tile cutting system of claim 6, wherein the upper and lower cutting elements are rotatable around the axis such that their positions with respect to aa center line running along the top surface length of the mosaic tile stock do not change when the cutting head is rotated.

8. The mosaic tile cutting system of claim 7, wherein the upper cutting element is connected to an upper cutting arm and the lower cutting element is connected to a lower cutting arm.

9. The mosaic tile cutting system of claim 8, wherein the upper and lower cutting arms are pivotally mounted between a first and a second carrier elements that are rotatably connected to a mosaic tile cutting apparatus base.

\* \* \* \* \*